United States Patent [19]

Higashiyama et al.

[11] Patent Number: 5,175,682
[45] Date of Patent: Dec. 29, 1992

[54] CHECK SYSTEM AND METHOD INCLUDING PRIORITIZING CHECKS FOR TRANSMISSION TO BANKS FOR PROCESSING

[75] Inventors: Connie Higashiyama, Redwood City, Calif.; William Melton, Herndon, Va.; Ashok Narasimhan, Los Altos, Calif.

[73] Assignee: Verifone, Inc., Redwood City, Calif.

[21] Appl. No.: 627,640

[22] Filed: Dec. 14, 1990

[51] Int. Cl.⁵ .............................................. G06F 15/30
[52] U.S. Cl. ..................................... 364/408; 235/379
[58] Field of Search ........................ 364/401, 406, 408; 235/379-383

[56] References Cited

U.S. PATENT DOCUMENTS

| | | | |
|---|---|---|---|
| 4,187,498 | 2/1980 | Creekmore | 235/379 |
| 4,321,672 | 3/1982 | Braun et al. | |
| 4,436,992 | 3/1984 | Simjian | 235/381 |
| 4,454,414 | 6/1984 | Benton | 235/383 |
| 4,948,174 | 8/1990 | Thompson et al. | |
| 4,972,463 | 11/1990 | Danielson et al. | 235/381 |
| 4,974,878 | 12/1990 | Josephson | |
| 4,977,595 | 12/1990 | Ohta et al. | 235/381 |
| 5,053,607 | 10/1990 | Carlson et al. | 235/379 |

OTHER PUBLICATIONS

"A complete guide to rule & Regulations Governing the Ach Network," 1990 Ach Rules, Copyright 1990, *National Automated Clearing House Assoc.*, OR 51-75.

*Primary Examiner*—Gail O. Hayes
*Attorney, Agent, or Firm*—Cooley, Godward, Castro, Huddleson, & Tatum

[57] ABSTRACT

A method and structure are provided for processing checks in an extremely timely and cost-effective manner. A check recipient, such as a merchant, utility billing department, and the like, utilize hardware and software for quickly gathering data from checks received in order to allow prompt processing of those checks. Such hardware preferably includes a reader for reading the MICR account information printed on the check, and means for associating that data with information pertaining to the transaction at hand, including for example, the dollar amount of the transaction. This information is combined in a data record which is stored for future batch data transmission to a clearing house or the issuing bank itself. In an alternative embodiment, this data is communicated in real time to the clearing house or issuing bank. In another embodiment, one or more selection criteria are used to determine which checks will be processed in real time, with the remaining checks being processed in the batch mode. For example, checks written above a threshold dollar amount, out of state checks, or any other high risk checks are processed in real time in order to minimize losses due to fraudulent check use.

19 Claims, 2 Drawing Sheets

CHECK SYSTEM AND METHOD INCLUDING PRIORITIZING CHECKS FOR TRANSMISSION TO BANKS FOR PROCESSING

INTRODUCTION

1. Technical Field

This invention pertains to electronic data processing of financial instruments, and more specifically to a method and structure for clearing checks written by a customer.

2. Background

FIG. 1 shows the typical path by which a check 101 finds its way to the issuing bank such that the checking account user's account is debited. As shown in FIG. 1, the customer writes check 101 and presents it to merchant 102 as a convenient way for the customer to make a payment to merchant 102. The merchant will then, typically at the end of the day, provide the check (together with others received that day) to the merchant bank 103, as a deposit to the account which merchant 102 maintains in merchant bank 103. Merchant bank 103, after posting the checks to Merchant 102 account, forwards a batch of checks to the automated clearing house (ACH) 104, such as that provided by the National Automated Clearing House Association (NACHA) of Washington, D.C. ACH 104 sorts the checks by their issuing banks, electronically transmits information pertaining to the checks to Federal Reserve Bank 105, and forward the paper checks to the appropriate issuing banks. Federal Reserve Bank 105 in turn electronically transmits information to issuing bank 106 so that each check 101 is debited to the check writer's account maintained in issuing bank 106. Since the vast majority of checks clear without problems, checks are assumed to be valid. If, the account has been closed, or the account contains non-sufficient funds, issuing bank 106 has a certain period of time in which it must issue an exception report indicating that the check has not cleared. This information is communicated to Merchant Bank 103 so that the check amount can be deducted from the merchant's account in order to nullify the deposit to the merchant's account made by Merchant Bank 103 when it assumed that the check was valid.

Table 1 depicts the typical time delay and costs associated with each check taking the prior art path shown in FIG. 1. While these costs and time delays do not seem particularly large to the uninitiated, partly due to the fact that most consumers are accustomed to the time delays involving clearing checks, it is highly advantageous to merchants and financial institutions to speed the check clearing process and reduce the costs associated therewith. Over 55 billion checks are written annually, of which 10 to 15 billion are written to merchants at the point of sale (POS). Thus, the cost associated with processing these checks, as well as the time delays involved in transferring funds (i.e., the "float") result in a very large cost associated with check processing. Magnetically encoded checking account numbers are printed on checks in order to speed this process, yet as shown in Table 1 the process remains inherently slow and costly.

TABLE 1

|  | Appropriate Time Delay | Approximate Cost per check |
| --- | --- | --- |
| Merchant to Merchant Bank | 1–5 days | $.05–.10 |
| Merchant Bank to ACH | 1 day | .01–.02 |

TABLE 1-continued

|  | Appropriate Time Delay | Approximate Cost per check |
| --- | --- | --- |
| ACH to Federal Reserve | 1 day | .01 |
| Federal Reserve to Issuing Bank | 1 day | .01 |

It has been attempted to utilize debit cards in place of checks and credit cards in order to allow merchants to instantly debit a customer's account. However, there are a number of disadvantages with debit card systems. First, debit card systems require processing in real time. Not only does this cause a time delay to both the consumer and the merchant, but the costs of maintaining communication links for real time processing are expensive, on the order of $0.15 per transaction. Furthermore, checking accounts and credit cards are already widely held, and there is some reluctance on the part of consumers to embrace debit cards. Merchants who accept debit cards, such as those gas stations which allow customers to pay using their automated teller machine (ATM) cards, find many consumers unwilling to utilize their ATM cards due to the additional expense (typically $0.15–0.25 per transaction) and perhaps the psychological reluctance to allow a merchant direct debit access to their bank account.

Furthermore, due to a lack of industry standards, for example pertaining to electronic networks, personal identification numbers (PINs), and encryption keys, inadequate customer incentives, and high costs, the use of debit cards has not become widely accepted.

Another disadvantage utilizing the present method for clearing checks is that the long time delay allows fraudulent check writers an excessive amount of time during which they are free to write fraudulent checks before their checking account numbers are added to a list of problem checking accounts.

SUMMARY OF THE INVENTION

In accordance with the teachings of this invention, a novel method and structure are provided for processing checks in an extremely timely and cost-effective manner. In accordance with the teachings of this invention, a check recipient, such as a merchant, utility billing department, and the like, utilize hardware and software for quickly gathering data from checks received in order to allow prompt processing of those checks. Such hardware preferably includes a reader for reading the MICR account information printed on the check, and means for associating that data with information pertaining to the transaction at hand, including for example, the dollar amount of the transaction. This information is combined in a data record which is stored for future batch data transmission to a clearing house or the issuing bank itself. In an alternative embodiment, this data is communicated in real time to the clearing house or issuing bank. In yet another embodiment of this invention, one or more selection criteria are used to determine which checks will be processed in real time, with the remaining checks being processed in the batch mode. For example, checks written above a threshold dollar amount, out of state checks, or any other high risk checks are processed in real time in order to minimize losses due to fraudulent check use.

DETAILED DESCRIPTION

Figure 2:
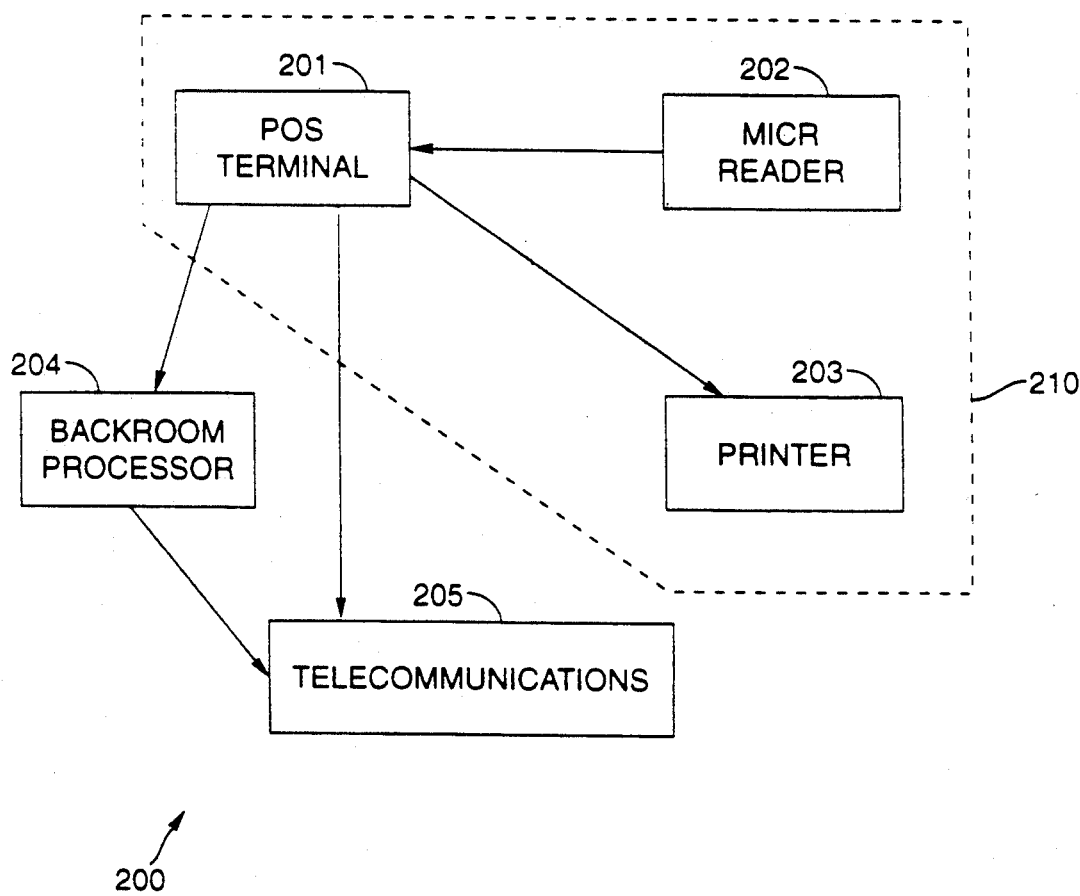
FIG. 2 is a block diagram depicting one embodiment of a transaction system constructed in accordance with the teachings of this invention.

FIG. 2 depicts one embodiment of a system for use by a merchant in accordance with the teachings of this invention. Merchant system 200 includes one or more point of sale systems 210 including, for example, point of sale terminal 201 such as a typical electronic cash register, or the like. Magnetic Ink Character Recognition (MICR) reader 202 is used for reading the magnetic account number printed on checks, which data is fed to POS terminal 201. Alternatively, the information pertaining to the check's account number, etc. can be entered in any convenient manner, for example via the keypad on the POS terminal 201, or via a customer identification card issued by the merchant. However, the use of the MICR reader allows greatest through put and accuracy. Printer 203 is used by POS terminal 201 for a variety of tasks, if desired, for example, printing a sales slip, printing validation information on a check, or printing a check receipt, as will be described in more detail later. POS terminal 201 is connected to backroom processor 204, such as those which are known in the prior art for maintaining sales information, performing price lookups, and inventory adjustment during the course of business. Telecommunications unit 205 is connected to backroom processor 204 and, if desired, directly to POS terminal 201 to allow data to be communicated to a check clearing house, for example.

The operation of the system of FIG. 2, in one embodiment, is as follows. The merchant utilizes POS terminal 201 to enter a transaction. POS terminal 201 can be, for example, a typical prior art electronic cash register, or a more sophisticated computer system. Alternatively, POS terminal 201 may be an accounts receivable system utilized by a public utility, for example, rather than the typical cash register found at a merchant.

The customer then tenders payment. Payments tendered utilizing credit cards, cash, or debit cards may be processed in a conventional manner. When the customer provides a check, however, the check is read by MICR reader 202 and the account information is provided to POS terminal 201. POS terminal 201 then provides additional information in order to create a data record for this transaction which is being paid for by check. Appropriate fields for this data record are, for example, as follows:

Date and Time
Merchant demand deposit account (DDA) number (checking account number)
Customer checking account No. and Routing information
Amount of check
Check No.
Any other discretionary data (electronic journaling)

Certain of this information can be provided automatically by POS terminal 201. Other information, such as amount the check is written for is provided by the merchant, for example via the POS keypad. Electronic journaling information is additional information which may either be retained by the merchant or used to provide a more precise indication of the nature of the purchase on the customer's monthly checking account statement. Such additional information may include, for example, the name of the merchant, the merchant's location, a summary of the goods for services provided, for example sorted by department in the department store. This electronic journaling information serves, for example, to reward the customer when reviewing his monthly statement that the charges appearing on the monthly statement are in fact correct. The merchant can use such additional information for other purposes, for example, to maintain some indication of a customer's buying preferences.

If desired, the data record is then used to verify check authorization, for example, by being compared to a positive file (which lists all allowable checking account numbers), or more likely against a negative file such as provided by SCAN of Seattle, Washington, Telecheck of Denver, Colorado or Telecredit of Florida, which provide information regarding known troublesome checking accounts. If such authorization is not provided, the transaction can, if desired, be cancelled by the merchant, thereby minimizing losses due to bad checks, as is well known.

Once authorization is provided (if the authorization step is performed), next the check is placed in printer 203 and validation information is printed on the check, if desired. Such validation information serves as an indication that electronic data pertaining to this check has been routed for collection, and that the check may thus be considered "cancelled." Such validation information includes, for example, information similar to a rubber endorsement stamp typically used by merchants who process checks in accordance with prior art techniques. Such information typically includes the merchant's name and the merchant's DDA number. The validation information prints in accordance with the teachings of this invention can also quite easily include the date and time of the transaction and language indicating that the check has been cancelled and is being cleared through to the customer's checking account electronically. Alternatively, other means can be used to provide validation information on the check, for example, a rubber stamp used for this purpose. While this is less desirable than using a printer, in certain circumstances it may obviate the need for additional printer, and a simple rubber stamp, or the like, can serve as a convenient backup in the event of printer failure. However, in a preferred embodiment, printer 203 is used for purposes in addition to providing validation information on a customer's check, for example, to assist in preparing credit card slips and the like.

Figure 1:
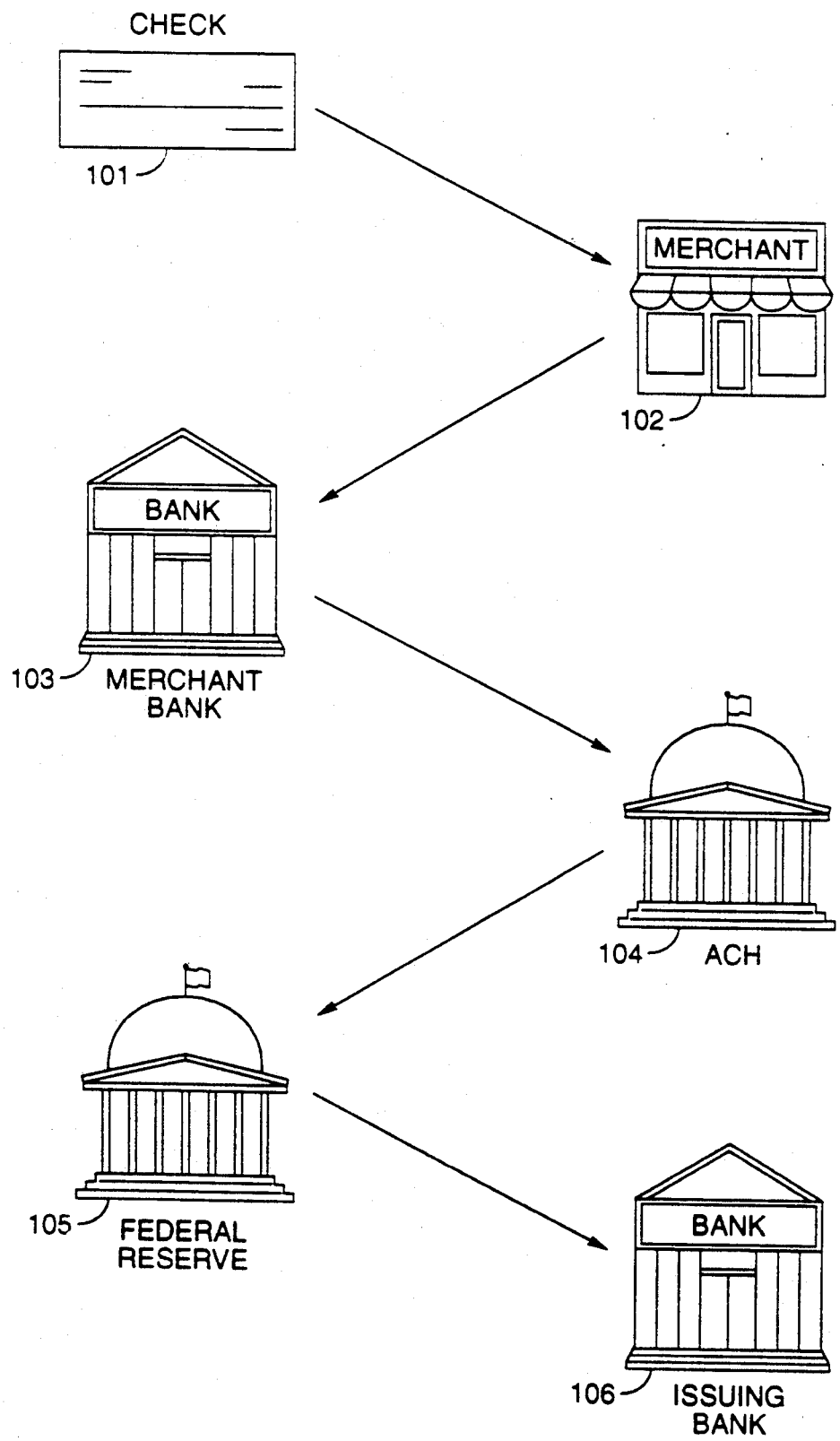
FIG. 1 depicts the typical prior art process by which a check is written and ultimately returned to the issuing bank.

The validated check is then returned to the customer for safekeeping, thus avoiding the need for the check to be physically transported through the system depicted in FIG. 1 for ultimate return to the customer. Alternatively, the check is retained by the merchant. This has the advantage of allowing the merchant to retain possession of the check in the event that there is a problem with its collection. In either event, whether the check is returned to the customer or retained by the merchant, a receipt is, if desired, printed and given to the customer indicating that payment has been made by check, and the check is being electronically cleared. This receipt can be either a part of or separate from another receipt indicating detailed information regarding the transaction just completed.

The data record thus created by POS terminal 201 can be added to a data file maintained by POS terminal 201 for batch uploading to backroom processor 204, for example, on a periodic basis or at the end of a shift. Alternatively, POS terminal 201 sends the data record to backroom processor 204 immediately, or as soon as backroom processor 204 is able to receive it. In this event, POS terminal 201 need only have sufficient storage capacity to serve as a buffer when there are delays in the ability of backroom processor 204 to receive data.

Periodically, backroom processor 204 will take the data records it has accumulated and upload them to a clearing house. Backroom processor 204 may first process the information, if desired. Various types of processing are possible, such as removing that data pertaining to checks written on the one or more banks with which a merchant does its own banking as well as those bank affiliate banks. This data is then uploaded to the appropriate bank directly, without the need of traveling through the clearing house system. Other types of backroom processing may be performed prior to transmitting check data to the clearing house or directly to one or more banks. For example, checks written over a threshold dollar amount, out-of-state checks, or other checks thought to be high risk based upon other criteria can be selected in order to prioritize data to be uploaded to the ACH or directly to a bank.

If desired, priority uploads may be performed either by backroom processor 204 or POS terminal 201 which, in one embodiment, is directly linked to telecommunications unit 205. Such priority uploads may serve a number of functions. For example, small batches of records may be uploaded relatively frequently by backroom processor 204 either directly to a bank or to the clearing house. Such priority uploads may include, for example, those which are greater than a pre-determined dollar amount. In one embodiment, priority uploads are performed by POS terminal 201 in a real time basis, for example, when the check amount exceeds a predetermined dollar amount, when the check is an out-of-state check, or any other criteria which may be programmed or selected by the merchant "on the fly" which may lead the merchant to view a particular check with some suspicion. In this event, the transaction is delayed pending the real time upload, thereby reducing losses due to bad checks.

Following the upload by backroom processor 204 to one or more banks and clearing houses, an exception report is printed by backroom processor 204 indicating problem checks contained within the uploaded data file, for example, checks written on closed accounts, or accounts having non-sufficient funds. This exception report is prepared from information received from the issuing bank, and is either sent electronically or by printed media either directly to the merchant or to the merchant via the Merchant Bank, the Federal Reserve Bank, and/or an automated clearing house. In one embodiment, backroom processor 204 will again upload for clearing those checks which have not cleared. If desired, a predetermined delay can be used prior to uploading this data again, in order to allow the customer to replenish his checking account before the second and subsequent tries. Alternatively, other criteria can be established by the merchant for determining how to handle such problem checks noted in the exception report. For example, the time delay, if any, before uploading for clearing such problem checks which have not cleared, can be selected based upon a predetermined set of criteria. Such criteria can include, for example, the time of day the check was written, the date the check was written, the day of the week the check was written, whether the check was written on an out-of-state bank account, or any other criteria selected by the merchant. For example, the merchant may determine that, statistically, different categories of checks should be handled differently in order to maximize the collection of such checks.

Thus, in accordance with the teachings of this invention, a check has essentially become the equivalent of an electronic debit card, but with significant advantages. The vast majority of consumers already have checking accounts, as compared with a smaller number have electronic debit cards. Therefore, the use of checks as debit cards in accordance with the teachings of this invention avoids the need for distributing or maintaining a separate debit card, with their associated costs. Furthermore, most consumers feel fairly comfortable with utilizing checks as a method of payment, far more comfortable than the use of electronic debit cards. The savings which will accrue to even a small merchant due to reduced bank paper handling fees, reduced losses due to bad checks, and more rapid availability of funds from checks will easily pay for the installation of hardware and software for use in accordance with the teachings of this invention.

In one embodiment to this invention, a primary record is used of, for example, 94 bytes as specified by the National Automated Clearinghouse Association (NACHA) 1990 ACH rules, specifically Appendix I entitled "ACH File Exchange Specifications". The "1990 ACH Rules" and the "1990 NACHA Operating Rules, Corporate Edition" are published by the National Automated Clearinghouse Association of Herndon, Virginia and are hereby incorporated by reference.

When such a primary record alone is used, the customer's monthly checking account statement will indicate for each check the date, check no., and amount without specific merchant information. Alternatively, each primary record is used with one or more appended records, for example each of an additional 94 bytes, to provide information such as the merchant's name and location and, if desired, more specific information such as the type of goods or services purchased, the quantity, and/or the exact name of the goods or services purchased can be included in such appended records for each purchase.

Due to the relatively small percentage of disputed checks, a preferred embodiment provides that the merchant electronically store all sales receipt line items, and provide to the clearing house a primary record only. In the case of disputed charges, the clearing house will request further information from the merchant, and the merchant transmits additional information to the clearing house as appended records to allow the clearing house to address the disputed charges. This minimizes the amount of information being transmitted, but allows full documentation to be transmitted in the event a particular check is disputed.

There are advantages in utilizing the teachings of this invention to the consumer, the merchant, and the banking system. The consumer advantages are that their time spent at a point of sale is reduced, as checks can be processed more quickly. Savings associated with bank processing of a customer's checking account may be passed on to the consumer.

The merchant benefits from a number of advantages in accordance with the teachings of this invention. Merchants can receive a quicker deposit and thus faster access to funds from checks received from customers. Deposit fees will likely be less, since the merchant is providing electronic data, rather than a paper check. Additional deposit fees can be saved if the merchant provides encoding on each check, such as MICR encoding, indicating the amount of the check. Since this encoding of the check amount saves the merchant bank processing time, merchant banks typically charge the merchant approximately 10 cents per check deposited if the merchant encodes the amount on each check, as compared with approximately 15 cents per check deposited which are not so encoded by the merchant. Depositing is much easier as a merchant need not fill out paper deposit slips, including various information pertaining to each check, as well as a total, and need not physically transport a batch of checks with their deposit slips to a bank. Checks which do not clear, for example because they are drawn on an account which is closed or an account with non-sufficient funds, are detected much quicker, thereby allowing a greater likelihood of collecting on returned checks as it is well known that collectibility decreases rapidly with age. A merchant having multiple stores benefits in that a central location may be used for consolidating check data, thereby providing the benefit that a merchant's check processing facilities can be consolidated, if desired, and allow check processing to be accomplished in a timely manner without delays associated with physically transporting paper checks to the central location prior to electronically processing those checks. The merchants are also afforded a greater flexibility on check deposits and bank relationships in that, because paper checks need not be physically transported to the merchant's bank, the merchant can select a bank solely on the basis of business consideration rather than the banks geographical proximity to the merchant.

The advantages to the banks are decreased processing costs, decreased float, and an ability to achieve their desired automated transaction plans which have not been achieved to date in large part due to the failure in the debit card programs. Furthermore, the banks are able to compete on a national basis with greater ease since the need not be geographically close to their customers for the purposes of depositing checks. Also, the banks are capable of eliminating handling of the physical check and its ultimate return to the consumer. This saves a great deal of physical infrastructure, as well as costs. Furthermore, the banks are able to receive the benefits of a debit card system without the need to educate consumers and without the attendant costs involved in the issuance of separate debit cards.

Other benefits are available as well. For example, in one embodiment of this invention, notification to a number of parties who are interested in learning of problem checks is made automatically, routinely, and in a cost effective and timely manner. For example, when the issuing bank does not honor a check, the issuing bank issues an exception report. If desired, this exception report can be used by either the issuing bank, the Federal Reserve Bank, the Automated Clearing House, the merchant's bank, or the merchant itself in order to notify other interested parties. Such other interested parties include the merchant's bank which must deduct the amount of the check which has not be honored by the issuing bank, the merchant, the merchant's collection agency, check authorization services, and check verification services. By promptly notifying each of these parties, collections can be speeded, and problem checks can be minimized. Furthermore, by notifying each of these parties automatically, notification costs are decreased.

Accordingly, the teachings of this invention provide a novel method and structure for handling checks having significant advantages over the prior art check clearing system. In accordance with the teachings of this invention, check are utilized much as are debit cards, but without the attendant disadvantages experienced in debit cards which have thus far lead to their poor acceptance.

The invention now being fully described, it will be apparent to one of ordinary skill in the art that many changes and modifications can be made thereto without departing from the spirit or scope of the appended claims.

All publications and patent applications mentioned in this specification are herein incorporated by reference to the same extent as if each individual publication or patent application was specifically and individually indicated to be incorporated by reference.

What is claimed is:

1. A method for processing a check written on an account provided by a financial institution comprising the steps of:
   receiving from a customer a check as a method of payment;
   creating an electronic data record containing information pertaining to said check; and
   electronically transmitting said data record to said financial institution to obtain payment of said check by said financial institution, said step of transmitting said electronic record to said bank comprising the steps of:
   determining if said electronic record meets a test indicating said electronic record should be transmitted to said bank in real time;
   if said test is met, transmitting said electronic record to said bank in real time; and
   if said test is not met, adding said electronic record to a file including other electronic records pertaining to other checks, and transmitting said file to said bank in a batch mode.

2. A method as in claim 1 wherein said test indicating said electronic record should be transmitted to said bank in real time serve to detect one or more of the following conditions: the amount of the check is greater than a threshold amount, the check is an out-of-state check, the check has not been preapproved by a check verification or check guarantee service, and the check is deemed to be of high risk.

3. A method as in claim 1 which further comprises the step of, after creating said electronic data record, imprinting information on the check indicating that the check has been cancelled and sent for collection by electronic data transfer.

4. A method as in claim 3 which further comprises the step of, after said step of printing, returning said check to the customer.

5. A method as in the claim 3 which further comprises the step of, after said step of printing, causing said merchant to retain said check.

6. A method as in claim 5 wherein, when the check is retained by the merchant, a receipt for the check is issued to the customer.

7. A method as in claim 6 wherein said receipt for the check comprises a portion of the standard sales receipt issued by the merchant.

8. A method as in claim 6 wherein said check receipt comprises a receipt separate from the normal sales receipt issued to the customer by the merchant.

9. A method as in claim 1 which further comprises the step of creating one or more additional electronic data records associated with said electronic data record for storing discretionary information regarding the sales transaction.

10. A method as in claim 9 which further comprises the step of electronically transmitting one or more of said additional data records with said data record to said financial institution.

11. A method as in claim 9 wherein said one or more additional data records are retained by the merchant in the event they are needed to verify a disputed transaction.

12. A method as in claim 11 wherein said one or more of said additional data records are electronically transmitted to said bank in the event of a disputed charge.

13. A method as in claim 1 which further comprises the steps of:
receiving an exception report indicating whether said check has not been honored by said financial institution; and
if said check has not been honored, again electronically transmitting said data record to said financial institution to obtain payment of said check by said financial institution after a predetermined period of time.

14. A method as in claim 13 wherein said predetermined period of time is selected in accordance with a set of one or more parameters of said check.

15. A method as in claim 14 wherein said one or more parameters are selected from the group of parameters consisting of: time the check was written, date the check was written, amount of the check, location of said financial institution, and other criteria for believing said check to be high risk.

16. A method as in claim 1 which further comprises the steps of:
issuing an exception report if said check has not been honored by said financial institution; and
automatically notifying one or more of said merchant, said merchant's bank, a check verification service, a check authorization service, and a collection firm.

17. A method as in claim 1 wherein said electronic data record comprises transaction information provided by an electronic device and information from said check.

18. A method as in claim 17 wherein at least some of said information from said check is detected by a MICR reader.

19. A method as in claim 17 wherein said electronic device comprises a POS terminal or a computer system controlling the transaction information for which payment is being made by said check.

* * * * *